Figure 1:
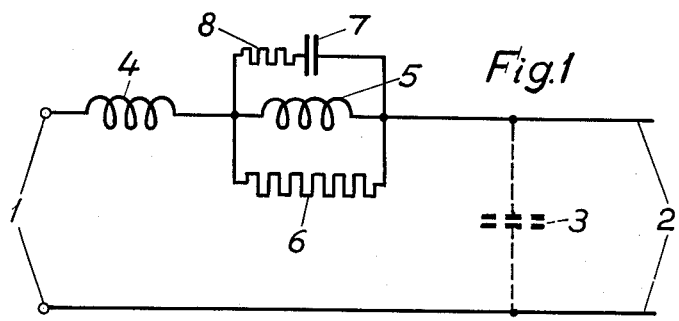

Jan. 10, 1956

E. UHLMANN 2,730,667

PROTECTIVE MEANS FOR HIGH VOLTAGE
DIRECT CURRENT TRANSMISSIONS

Filed April 23, 1952

INVENTOR.
Erich Uhlmann
BY
Attorney.

United States Patent Office 2,730,667
Patented Jan. 10, 1956

2,730,667

PROTECTIVE MEANS FOR HIGH VOLTAGE DIRECT CURRENT TRANSMISSIONS

Erich Uhlmann, Ludvika, Sweden, assignor to Allmanna Svenska Elektriska Aktiebolaget, Vasteras, Sweden, a Swedish corporation Application April 23, 1952, Serial No. 283,906

Claims priority, application Sweden April 23, 1951

3 Claims. (Cl. 321—2)

It has been heretofore proposed to provide, for the protection of transmissions employing high voltage direct current, devices the characteristic feature of which is that an additional reactor is connected in series or an additional capacity in parallel with the line and combined with energy dissipating means, the inductance of the additional reactor or the additional capacity being several times the normal one. This condition of dimensioning is based on the presumption that such oscillations which arise in the line on the occasion of switching operations or of atmospherical over-voltages as a consequence of the capacity of the line itself or of protective capacities connected in parallel to said line in co-operation with the aforesaid inductances shall be damped to a substantially aperiodical surge.

It has now been found, first that a damping down to full aperiodicity is not necessary in order to keep the over-voltages caused by the oscillations within reasonable limits, but that a smaller damping may be sufficient for this purpose, which makes it possible to use a damped reactor having a smaller inductance, and secondly that this inductance may be further reduced if the reactor is shunted not only by an ohmic resistor but also by a capacity, as has also been heretofore proposed. The present invention comprises such protective devices. By the invention it will be possible to reduce the inductance of the damped reactor to the same order of magnitude as the inductance of the normal (non-damped) reactor. By the expression "same order of magnitude" it is here understood that the proportion between the two quantities compared may vary between $\sqrt{10}$ and $$\sqrt{\frac{1}{10}}$$

thus substantially between 1:3 and 3:1.

The invention is at any rate clearly distinguished from such protective devices, using combinations of inductance, capacity and resistance which have been previously proposed for alternating current installations, by the order of magnitude of the protective members employed. While for instance in a reactor inserted in an alternating current line a maximum of voltage drop of 5 per cent of the total voltage has been permitted at normal current load, in order that the normal operation shall not be unduly disturbed, quite other rules are applicable to the dimensioning of the shunted reactor in the present case which make the inductance several times larger. One such rule may for instance be that a resonance between the said reactor and the line capacitor shall not occur at a higher frequency than three times that of the alternating current voltage, while at the same time the maximum current at the switching in of the full voltage shall not exceed a certain multiple of the normal current, for instance twice that current. This rule gives an inductance of the reactor which at the frequency of the alternating current would give a voltage drop of at least one sixth of the normal voltage, thus more than three times the hitherto permitted one. In an inverter also the condition is added that the time derivative of the current must be limited to a certain value depending on the general constants of the circuit, in order that the rate of rise of current during an initiated commutation shall not imperil the fulfilling of said commutation. This condition gives a minimum value of the inductance which for alternating current would give a voltage drop of at least one fourth of the total voltage. Other conditions, as a limitation of the instantaneous short circuit current of a rectifier to five times the normal current, would give other minimum values of the inductance, for instance corresponding to 20 per cent voltage drop at the frequency of the alternating current. All the values of the inductance now mentioned are to be regarded as minimum values, and for further elucidation of the question it may be mentioned that in an actual practical case the inductance at the inverter end alone is so dimensioned that it would consume, at normal current and 50 cycles, practically the whole line voltage.

It has been found appropriate to connect an ohmic resistance as well as a capacity directly in parallel to the additional inductance. The latter and the capacity may then be so dimensioned as to be in resonance and thus act as a blocking path for the frequency at which the non-shunted reactor is in resonance with the line capacity and which would thus, in the absence of protective means, tend to generate dangerous series resonance oscillations. The capacity of the condenser should be of the same order of magnitude as that of the line, and if this capacity is designated by C and the inductance of either reactor by L, the parallel resistance should, in order to give a minimum of over-voltage, be of the order of magnitude $$\sqrt{\frac{L}{C}}$$

In one form of the invention, two reactors may be connected in parallel instead of in series, while the damping resistor is connected in series with one of the reactors and in parallel with a capacity. The total inductance of the two parallel reactors should then correspond essentially to the inductance of the non-damped reactor of the first-named connection. As another modification, the damping circuit may be connected to a secondary winding of one of the reactors. Generally speaking, the invention may be regarded as characterized by a combination of at least two cooperating reactors, the inductances of which are of the same order of magnitude, and at least one of which is connected to a damping device.

Figure 3:
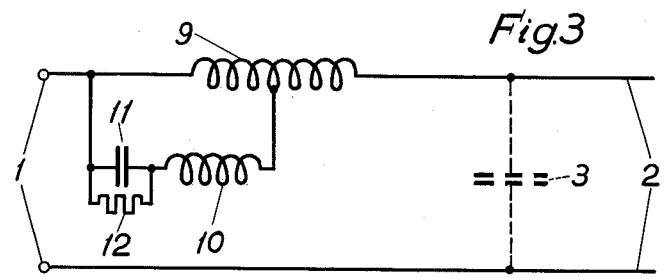
Figure 4:
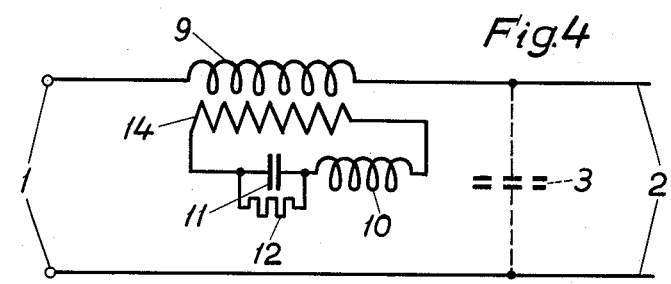
Figure 5:
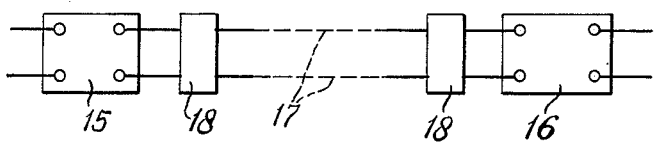

In the accompanying drawing, Figs. 1–4 show diagrams of connections of four different forms of the invention, and Fig. 5 shows an arrangement of a direct current line in which damping devices according to the invention, schematically represented by rectangles, are arranged at certain intervals, for example, on an air line at every 300 km.

In Fig. 5 the rectifier 15 and the inverter 16 are connected to the line 17 and to the protective devices 18, which may be of substantially the same character at both ends of the line 17, although they may in many cases be of somewhat different dimensions.

In each of Figs. 1 to 4, 1 designates the terminals of a static current converter (rectifier or inverter) and 2 the direct current line connected to said terminals, for instance a cable line, for which the invention is of particular importance. The capacity of said line is illustrated in dotted lines as concentrated in a condenser 3. In Fig. 1, 4 is a smoothening reactor for the converter, serving at the same time, on the occasion of a change in the operating conditions likely to cause a rise of current, to limit the rate of such rise so as not to cause any serious perturbation.

According to this form of the invention, the reactor 4 is connected in series with another reactor 5 of the same order of magnitude, which is shunted by an ohmic resistor 6 and a condenser 7, which latter may be in series with an ohmic resistor 8. The condenser 7 and especially the resistor 8 may be omitted, but the condenser has the advantage that the reactor 5 may be made smaller.

The reactor 5, which mainly serves to limit the overvoltages occurring at variations of current, should, as shown by calculations, be of the same order of magnitude as the reactor 4 for accomplishing this function. The condenser 7 should in its turn, if present, preferably have a capacity of the same order as the line capacity symbolized by the condenser 3. The main function of the resistor 6 is to reduce the duration of the voltage surges, and it should in practice be dimensioned substantially according to the previously given rule in relation to the inductance of the reactor 5 and to the capacity of the condenser 7.

Figure 2:
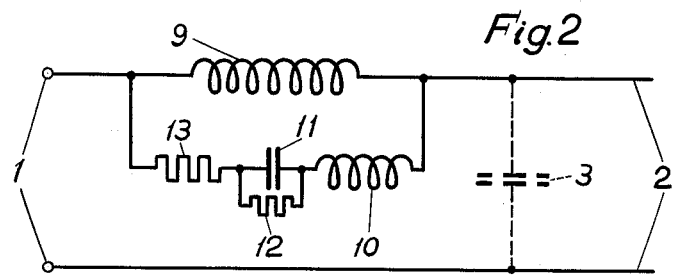

In Fig. 2, there are employed for limiting over-voltages, which may arise, two reactors 9, 10 connected in parallel and preferably representing together an inductance of the same order of magnitude as the reactor 4 alone in Fig. 1. Since in Fig. 1, at a rapid rise of current, the reactor 4 practically alone determines the rate of rise—as the resistor 6 and the capacitative shunt 7, 8 nearly short-circuit the reactor 5—the rate of current rise will in this manner be practically the same as in Fig. 1. In series with the reactor 10 there is a condenser 11 and in parallel with this condenser a resistor 12. Since the members 10 and 12 are, in normal operation, intended to be traversed by a much smaller current than the reactor 9, the circuit through the former ones may contain a considerably higher ohmic resistance than the reactor 9. In the drawing, this has been indicated by a separate series resistor 13, but in practice it is generally more economical to incorporate the resistance into the reactor 10, thereby reducing the copper quantity (and also the iron quantity) of this reactor.

Regarding the mutual dimensioning of the reactors, a calculation shows that their inductance values should be of the same order, but that the reactor 10 in normal operation is traversed by a current limited by the resistors 12 and 13 to a small fraction (some per cent) of the main current, whence the reactor may be dimensioned for a much smaller kva. rating than the reactor 9. The capacity of the condenser 11 should in this case be about one-fourth of the line capacity and the resistor 12 of the order of magnitude of $$4\sqrt{\frac{L}{C}}$$

where L is the resultant inductance of the reactors 9 and 10 and C the line capacity. In an actual practical case this corresponds to a resistance of some thousand ohms.

Since the reactor 10, as already mentioned, need only be dimensioned for a small fraction of the current of the reactor 9, but on the other hand must be insulated for substantially the same voltage as the reactor 9, the reactor 10 may in some cases obtain an uneconomical proportion between conducting and insulating materials. The connections of Fig. 2 may therefore be modified as shown in Fig. 3, i. e. so that only a portion of the voltage across the reactor 9 is impressed on the series connection of the reactor 10 and condenser 11 with parallel resistor 12. Hereby also the advantage is gained that the condenser 11 can be made for a lower voltage. The operation is otherwise substantially the same as in Fig. 2.

The condition that the two inductances shall be of the same order of magnitude is in this case of course valid for the inductance 10 referred to the main circuit, so that its real inductance shall be reduced in proportion to the square of the voltage, thus in proportion to the square of the fraction of the inductance 9 to which it is connected in parallel.

Another possible modification of Fig. 2 is shown in Fig. 4. The reactor 10 and condenser 11 with its parallel resistor 12 are here connected to a secondary winding 14 of the reactor 9. In this manner a greater liberty is obtained as regards the choice of voltage and current conditions in the elements 10-12 than in Fig. 3, but at the same time the cost of the secondary winding 14 is added. Whether the advantages or the disadvantages of a connection according to Fig. 4 as compared with that according to Fig. 3 predominate, depends on the conditions in each particular case. Also in Fig. 4 the inductance of the reactor 10 shall be counted as referred to the main circuit, the real inductance being reduced in proportion to the square of the ratio between the secondary winding 14 and the reactor 9.

I claim as my invention:

1. A power transmission system operating with high voltage direct current, comprising a rectifier installation, an inverter installation, a connecting direct current line extending between said installations, a reactor between each of said installations and said line, said reactor having an inductance sufficient to limit the rate of change of the line current at any change of the load to a reasonable value, another reactor cooperating with each of the first-named reactors and connected between said line and each of said installations and having an inductance of the same order of magnitude as the first-named reactors, and energy dissipating means connected to at least one of said reactors.

2. A power transmission system operating with high voltage direct current, comprising a rectifier installation, an inverter installation, a connecting direct current line extending between said installations, a reactor between each of said installations and said line, said reactor having an inductance sufficient to limit the rate of change of the line current at any change of the load to a reasonable value, another reactor connected in series with each of the first-named reactors and having an inductance of the same order of magnitude, and energy dissipating means connected to at least one of said reactors.

3. A power transmission system operating with high voltage direct current, comprising a rectifier installation, an inverter installation, a connecting direct current line between said installations, a reactor connected between each of said installations and said line and having an inductance sufficient to limit the rate of change of the line current at any change of the load to a reasonable value, another reactor, the inductance of which, referred to the main circuit, is of the same order of magnitude as the first-named reactor, the said reactors being connected in parallel with each other and the resultant inductance of the two parallel reactors being sufficient to limit the rate of change of the line current at any change of the load to a reasonable value, and energy dissipating means connected in series with at least one of said reactors.

4. A power transmission system operating with high voltage direct current, comprising a rectifier installation, an inverter installation, a connecting direct current line between said installations, a reactor between each of said installations and said line, said reactor having an inductance sufficient to limit the rate of change of the line current at any change of the load to a reasonable value, another reactor cooperating with the first-named reactor and connected between said line and said installation and having an inductance of the same order of magnitude as the first-named reactor, and an ohmic resistor connected in parallel to at least one of said reactors.

5. A power transmission system operating with high voltage direct current, comprising a rectifier installation, an inverter installation, a connecting direct current line between said installations, a reactor connected between each of said installations and said line and having an inductance sufficient to limit the rate of change of the line current at any change of the load to a reasonable value, another reactor cooperating with the first-named reactor and connected between said line and said installation and having an inductance of the same order of magnitude as the first-named reactor, and energy dissipating means for at least one of said reactors comprising a condenser connected in parallel to said reactor.

6. A power transmission system operating with high voltage direct current, comprising a rectifier installation, an inverter installation, a connecting direct current line extending between said installations, a reactor connected between each of said installations and said line and having an inductance sufficient to limit the rate of change of the line current at any change of the load to a reasonable value, another reactor, the inductance of which, referred to the main circuit, is of the same order of magnitude as the first-named reactor, said reactors being connected in parallel with each other and the resultant inductance of the two parallel reactors being sufficient to limit the rate of change of the line current at any change of the load to a reasonable value, and a condenser with a parallel resistor connected in series with at least one of said reactors.

7. A power transmission system operating with high voltage direct current, comprising a rectifier installation, an inverter installation, a connecting direct current line extending between said installations, a reactor located between each of said installations and said line and having an inductance sufficient to limit the rate of change of the line current at any change of the load to a reasonable value, another reactor connected in parallel to a portion of the first-named reactor, the inductance of said second-named reactor, referred to the main circuit, being equal to that of the first-named reactor and the resultant inductance of the two combined reactors being sufficient to limit the rate of change of the line current at any change of the load to a reasonable value, and energy dissipating means connected in series with at least one of said reactors.

8. A power transmission system operating with high voltage direct current, comprising a rectifier installation, an inverter installation, a connecting direct current line extending between said installations, a reactor connected between each of said installations and said line and having an inductance sufficient to limit the rate of change of the line current at any change of the load to a reasonable value, a secondary winding on said reactor, another reactor, the inductance of which, referred to the primary circuit, is equal to that of the first-named reactor, the resultant inductance of the two combined reactors being sufficient to limit the rate of change of the line current at any change of the load to a reasonable value, and energy dissipating means connected in series with at least one of said reactors.

References Cited in the file of this patent

UNITED STATES PATENTS

| | | |
|---|---|---|
| 1,227,416 | Fortescue | May 22, 1917 |
| 1,759,545 | Crouse | May 20, 1930 |
| 1,808,589 | Amsden | June 2, 1931 |
| 1,815,141 | Crouse | July 21, 1931 |
| 1,998,325 | Lyman | Apr. 16, 1935 |

FOREIGN PATENTS

| | | |
|---|---|---|
| 516,140 | Great Britain | Dec. 22, 1939 |
| 641,290 | Great Britain | Aug. 9, 1950 |